Figure 1:
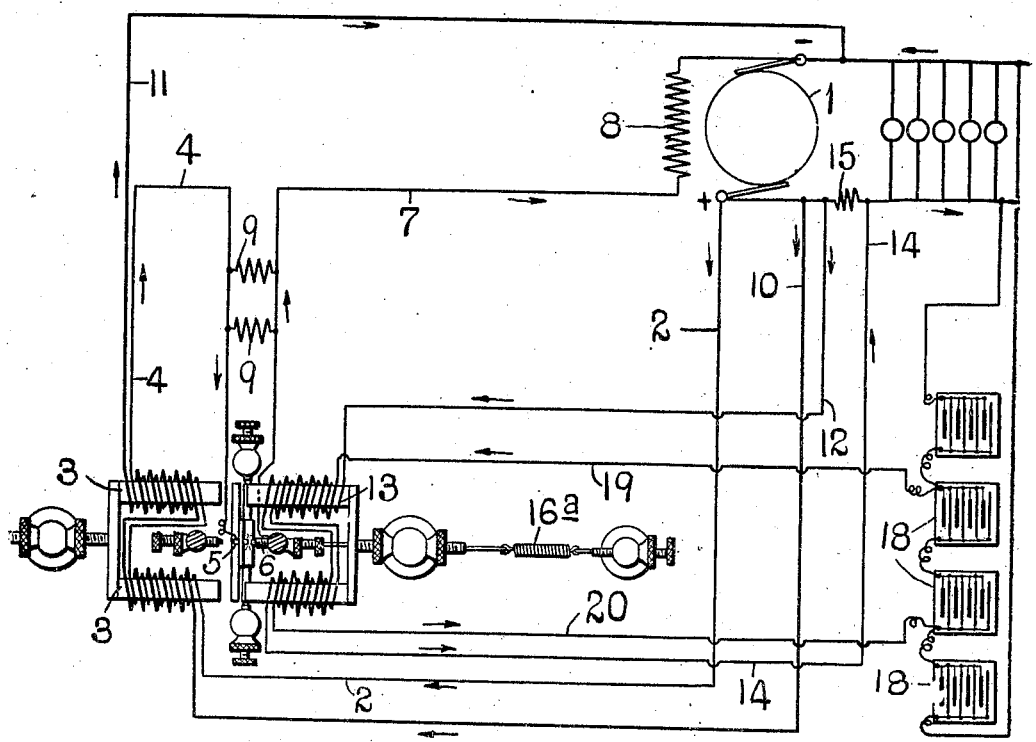

No. 838,802. PATENTED DEC. 18, 1906.
G. S. NEELEY.
AUTOMATIC REGULATOR FOR DIRECT CURRENT DYNAMOS.
APPLICATION FILED SEPT. 29, 1905.

3 SHEETS—SHEET 1.

Witnesses
A. J. McCauley.
George Bakewell

Inventor:
George S. Neeley
by Bakewell & Cornwall
Atty's.

No. 838,802. PATENTED DEC. 18, 1906.
G. S. NEELEY.
AUTOMATIC REGULATOR FOR DIRECT CURRENT DYNAMOS.
APPLICATION FILED SEPT. 29, 1905.

3 SHEETS—SHEET 2.

Fig. 2ª.

Witnesses
A. J. McCauley.
George Bakewell

Inventor:
George S. Neeley
by Newell Cornwall
Atty's.

No. 838,802. PATENTED DEC. 18, 1906.
G. S. NEELEY.
AUTOMATIC REGULATOR FOR DIRECT CURRENT DYNAMOS.
APPLICATION FILED SEPT. 29, 1905.

3 SHEETS—SHEET 3.

Fig. 3ª

Witnesses
A. J. McCauley.
George Bakewell

Inventor
George S. Neeley
by Bakewell Cornwall
Atty's.

UNITED STATES PATENT OFFICE.

GEORGE S. NEELEY, OF ST. LOUIS, MISSOURI.

AUTOMATIC REGULATOR FOR DIRECT-CURRENT DYNAMOS.

No. 838,802.　　　　　Specification of Letters Patent.　　　　　Patented Dec. 18, 1906.

Application filed September 29, 1905. Serial No. 280,631.

*To all whom it may concern:*

Be it known that I, GEORGE S. NEELEY, a citizen of the United States, residing at St. Louis, Missouri, have invented a certain new and useful Improvement in Automatic Regulators for Direct-Current Dynamos, of which the following is a full, clear, and exact description, such as will enable others skilled in the art to which it appertains to make and use the same, reference being had to the accompanying drawings, forming part of this specification.

This invention relates to a new and useful improvement in automatic regulators for direct-current dynamos, and is adapted for use whether said dynamos supply electricity for light or power or for the purpose of charging storage batteries, and has for its object the automatic maintenance of a constant voltage on the supply-wires regardless of load changes or speed variations as great as fifty per cent.

My invention is especially adapted in the charging of storage batteries for use in train lighting, where the speed of the dynamo depends upon the axle drive of the car.

Broadly speaking, my improvement embodies a means whereby the intensity and potential of the electrical output of the dynamo automatically regulates the intensity of the electrical input, "input" in this sense meaning the electrical energy necessary to excite the field of the dynamo.

The general arrangement of my improved systems is shown in the accompanying drawings, which systems include a combination of two magnets in opposition to each other, or a combination of windings and opposite direction of current-flow, which will produce the same result as the two magnets opposed to each other and which are designed to attract in opposite directions; a single armature common to both. This armature carries one of a pair of contacts which are so mounted that it moves with the armature and is therefore influenced by the magnets in proportion to their energizing sources. A spring is used to hold the armature in such position that the contacts will be together when the voltage is below normal or the dynamo is not generating any voltage or current.

Figure 2:
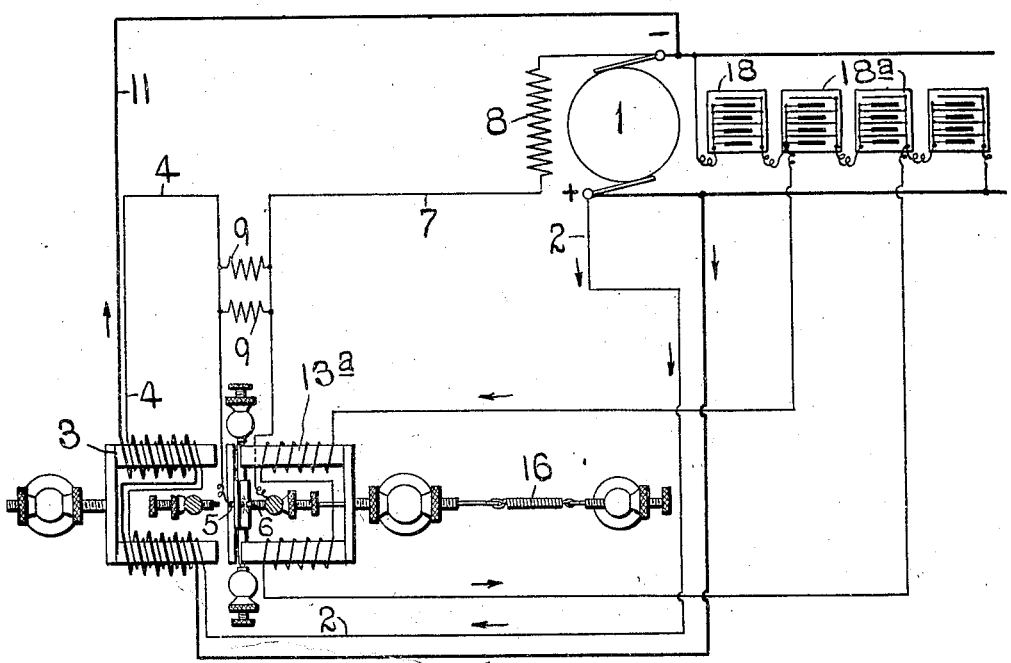
Figure 2:
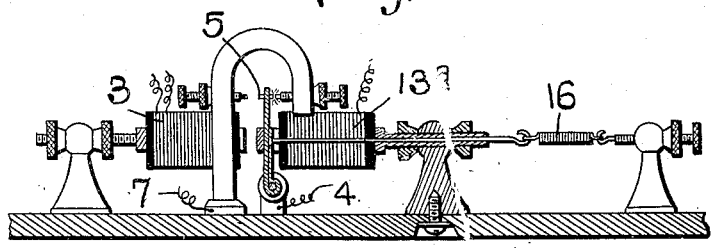
Figure 3:
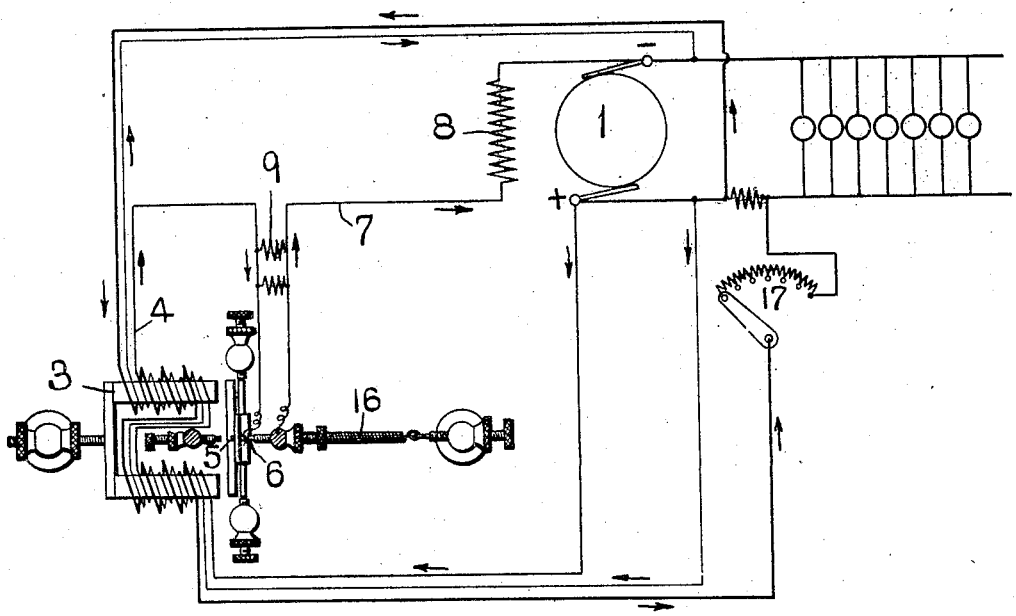
Figure 3:
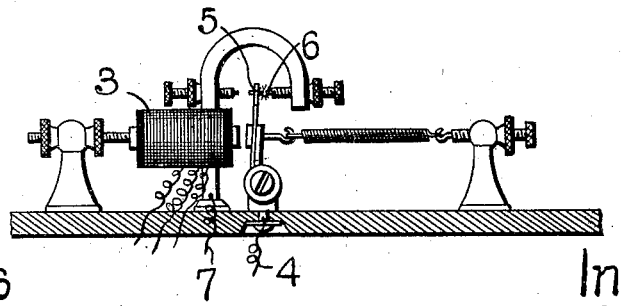

In the accompanying drawings, Figure 1 is a diagrammatic view illustrating my improved system adapted to be used for a general lighting or power purpose as well as the charging of storage batteries. Fig. 2 is a diagrammatic view of a system of regulation where the dynamo is used to charge the storage battery only. Fig. 2$^a$ is a side elevational view illustrating the relative position of the parts of the form of regulator shown in Fig. 2. Fig. 3 is a diagrammatic view illustrating a system wherein the dynamo supplies electricity for lighting or supply purposes only, and Fig. 3$^a$ is a side elevational view illustrating the relative position of the parts of the form of regulator shown in Fig. 3.

Referring to Fig. 1, 1 indicates a self-exciting generator having the usual brushes of opposite polarity. The field-circuit of the generator passes from the positive brush by wire 2 through a winding on the magnet (or pair of magnets) 3 in series therewith, and thence by wire 4 through the movable contact 5 and the fixed contact 6 via wire 7 to the field-winding 8 of the generator, thence to the negative brush of the dynamo. The distance between the contacts 5 and 6 forms the variable resistance for increasing or decreasing the field flux of the dynamo. A carbon resistance 9, whose temperature coefficient is negative, connected to wires 4 and 7, is placed as a shunt connection across the contacts forming the variable resistance. The action of this part of the regulator is the same as that described in companion application, serially numbered 269,856 filed by me July 15, 1905. The system described in my aforesaid application, however, is not automatic in its action, but requires manual adjustment for every new load condition in order to maintain the voltage of the supply-wires constant.

The novel feature of my present invention consists in the addition of two or more parallel windings on the magnet 3, which renders the action of my new regulator entirely automatic, one of which windings is connected across the brushes of the dynamo in the following manner: 10 is a wire leading from the positive brush and connected to a winding or coil on the magnet 3, a wire 11 leading from the opposite end of said coil to the negative brush of the dynamo. The object of this winding is to utilize slight changes in the circuit voltage to assist the field-current. The third winding of the magnet 3 is placed either over the first two windings, as shown in Fig. 3, or on a separate core, as shown in Fig. 1, in which latter figure a wire 12 leads from the supply-wire of the lamp or work circuit to one of the windings constituting part of magnet 13, the return-wire 14 being connected to the supply-wire of the lamp or work circuit on the opposite side of the resistance-coil 15 in series with the lamp or work circuit, and which resistance-coil tends to shunt a proportional current from the supply-wire of the lamp or work circuit through the magnet 13. The action of a third winding with a proportional current from the working circuit and flowing in the opposite direction to the field-current and the voltage in the first two windings can be made to do the same work as a separate core if the regulator is to be used with a generator that is supplying current for lighting purposes only. In Fig. 3 it will be observed that this third winding is placed over the first two windings and the current passed therethrough in an opposite direction to the direction of passage of the field-current and the voltage of the dynamo referred to above, the direction of the current in all of the circuits being indicated by arrows, and thereby automatically demagnetizing or neutralizing the magnetism of the core of magnet 3 (see Fig. 3) in proportion to the increased load on the dynamo, since the current taken by this winding is proportional to the current in the working circuit, which allows the constant force of the spring 16 to proportionately shorten the distance between the contacts 5 and 6, which cuts down the variable resistance in the field-circuit, and consequently automatically preserves a constant voltage regardless of increasing the electrical output or speed variation. The small rheostat 17 (shown in Fig. 3) is arranged in the circuit containing this third winding and serves to regulate the effectiveness of the current flowing in this circuit. Where the third winding is placed on a separate core 13, as shown in Fig. 1, and exerts a pull on the common armature carrying the movable contact 5 in a direction opposite to the pole of the magnet 3, energized by the field-current and assisted by the voltage, the rheostat shown in Fig. 3 may be dispensed with by arranging the magnet 13 so that it may be shifted toward or away from the armature, and thus regulate the air-gap and effectively control the pull exerted by this magnet, hand-nuts being provided for this particular purpose.

My improved voltage-regulator is adaptable to the regulation of dynamos used to charge storage batteries. It is known in the art that when dynamos are used for this work some means must be provided to raise the voltage of the dynamo when the batteries are nearing their maximum charge. Were this not done, the charging-dynamo would give the current forced back by the counter electromotive force from the batteries an opportunity to flow back into the generator at the slightest loss of voltage of the charging-dynamo. In my system, referring to Fig. 1, wherein 18 represents the battery-cells to be charged by the dynamo, I lead a wire 19 preferably from one of the middle cells to a coil around the magnet 13, the circuit being completed through wire 20, leading from said coil back to another middle cell of the series of battery-cells. The action of this winding on magnet 13 is to assist the spring $16^a$ in moving the movable contact toward the fixed contact. The voltage of the middle cells is thus utilized to magnetize this magnet in proportion to the rise of voltage of all the batteries, which action automatically and effectively keeps the voltage of the charging-dynamo slightly in excess of that of the batteries.

In Fig. 2 it will be observed that the middle cells 18 of the battery are connected in parallel to an opposing magnet $13^a$ to assist the spring 16 in tending to cut out the variable resistance and bring the contacts 5 and 6 together, so as to keep the voltage of the charging-dynamo slightly in excess of that of the batteries.

Having thus described the invention, what is claimed as new, and desired to be secured by Letters Patent, is—

1. A voltage-regulator comprising a variable resistance connected in series with the field of the dynamo, a magnet having a plurality of windings one of which is in series with the shunt-field of the dynamo and the said variable resistance, whereby the incremental action of the field-current flowing through said winding increases the magnetic saturation of said magnet, which tends to increase said variable resistance, the other winding on said magnet being in multiple with the work-circuit of the said dynamo whereby the incremental action of the voltage of the dynamo also increases the saturation of said magnet which assists the action of the field-current to increase said variable resistance, and means operating in opposition to said two windings on said magnet for decreasing said variable resistance; substantially as described.

2. A voltage-regulator comprising a variable resistance connected in series with the field of the dynamo, a magnet having a plurality of windings one of which is in series with the shunt-field of the dynamo and the said variable resistance, whereby the incremental action of the field-current flowing through said winding increases the magnetic saturation of said magnet, which tends to increase said variable resistance, the other winding on said magnet being in multiple with the work-circuit of the said dynamo whereby the incremental action of the voltage of the dynamo also increases the saturation of said magnet which assists the action of the field-current to increase said variable resistance, and a spring operating in opposition to said two windings on said magnet for decreasing said variable resistance; substantially as described.

3. A voltage-regulator comprising a variable resistance in series with the field of the dynamo, a magnet having a plurality of separate windings, one of said windings being in series with the field of the dynamo and the said variable resistance, whereby the incremental action of the field-current tends to increase the saturation of said magnet and thereby increase said variable resistance, a second winding connected across the brushes of the dynamo and in which the incremental action of the voltage of the dynamo assists the field-current to increase the saturation of said magnet and thereby the said variable resistance, a constant resistance in series with the positive line of the working circuit, and a third winding arranged in opposition to said first two windings, said third winding forming a shunt-circuit around the said constant resistance whereby the incremental action of the current in the working circuit causes a proportional current to flow in said third winding in opposition to that of the field-current, and the voltage of said dynamo in said first two mentioned windings, whereby the current in the third winding counteracts the incremental action of the field-current and tends to decrease said variable resistance in opposition to the action of said first two windings tending to increase said variable resistance; substantially as described.

4. A voltage-regulator comprising a variable resistance in series with the field of the dynamo, a magnet having a plurality of separate windings, one of said windings being in series with the field of the dynamo and the said variable resistance, whereby the incremental action of the field-current tends to increase the saturation of said magnet and thereby increase said variable resistance, a second winding connected across the brushes of the dynamo and in which the incremental action of the voltage of the dynamo assists the field-current to increase the saturation of said magnet and thereby the said variable resistance, a spring for opposing the action of the field-current and voltage for the purpose of decreasing said variable resistance, a constant resistance in series with the positive line of the working circuit, and a third winding arranged in opposition to said first two windings, said third winding forming a shunt-circuit around the said constant resistance whereby the incremental action of the current in the working circuit causes a proportional current to flow in said third winding in opposition to that of the field-current, and the voltage of said dynamo in said first two mentioned windings, whereby the current in the third winding counteracts the incremental action of the field-current and tends to decrease said variable resistance in opposition to the action of said first two windings tending to increase said variable resistance, said spring tending to decrease the variable resistance when the intensity of the current in the working circuit is increased, a regulating resistance in series with the said third winding for regulating the effectiveness of the current in said winding, and a resistance connected as a shunt to the said variable resistance; substantially as described.

5. A voltage-regulator comprising the combination with a variable resistance connected in series with the field of the dynamo, a magnet having separate windings one of which is in series with the shunt-field of said dynamo and the said variable resistance, whereby the incremental action of the field-current tends to increase said variable resistance, the second winding on said magnet being across the brushes of the dynamo, whereby the incremental action of the voltage of the dynamo assists the action of the field-current to increase the said variable resistance, a third opposing winding energized by a current proportional to the intensity of the electrical output of the dynamo whereby the incremental action of the electrical output electrically assists to decrease the said variable resistance, and thereby causes the intensity of the shunt-field current to increase when the said electrical output is increased, a fourth winding connected in multiple with the middle cells of a storage battery charged from said dynamo whereby the incremental action of the counter electromotive force of the batteries automatically and independently decreases the said variable resistance, and thereby causes the dynamo to automatically keep its voltage slightly in excess of the counter electromotive force of the batteries; substantially as described.

6. A voltage-regulator comprising the combination with a variable resistance connected in series with the field of the dynamo, a magnet having separate windings one of which is in series with the shunt-field of said dynamo and the said variable resistance, whereby the incremental action of the field-current tends to increase said variable resistance, the second winding on said magnet being across the brushes of the dynamo, whereby the incremental action of the voltage of the dynamo assists the action of the field-current to increase the said variable resistance, a third opposing winding energized by a current proportional to the intensity of the electrical output of the dynamo whereby the incremental action of the electrical output electrically assists to decrease the said variable resistance, and thereby causes the intensity of the shunt-field current to increase when the said electrical output is increased, a fourth winding, connected in multiple with the middle cells of a storage battery charged from said dynamo whereby the incremental action of the counter electromotive force of the batteries automatically and independently decreases the said variable resistance, and thereby causes the dynamo to automatically keep its voltage slightly in excess of the counter electromotive force of the batteries, a spring, the tension of which assists the action of the current in the third and fourth windings, and a resistance whose temperature coefficient is negative connected as a shunt to the said variable resistance; substantially as described.

7. A voltage-regulator for a self-exciting dynamo comprising the combination of a variable resistance in series with the field of the dynamo, an artificial magnet having a plurality of separate windings, one of said windings being connected in series with the field of the dynamo and the said variable resistance whereby the incremental action of the field-current tends to increase the said variable resistance, a second winding being connected across the brushes of the said dynamo whereby the incremental action of the voltage of the dynamo assists the field-current to increase the said variable resistance, a spring for opposing the action of the field-current and the voltage for the purpose of decreasing the said variable resistance, a constant resistance in series with the positive line of the working circuit, and a third winding on the said artificial magnet, said third winding forming a shunt-circuit around the said constant resistance whereby an incremental action of the current in the working circuit causes a proportional current to flow in said third winding in opposition to the field-current, and the voltage of the said dynamo, the action being to counteract the incremental action of the field-current and thereby allow the tension of said spring to decrease the said variable resistance when the intensity of the current in the working circuit is increased, a regulating resistance in series with the said third winding for regulating the effectiveness of the current in said winding, and a resistance connected as a shunt to the said variable resistance; substantially as described.

8. A voltage-regulator for a self-exciting dynamo comprising the combination with a variable resistance connected in series with the field of the said dynamo, two opposing artificial magnets, one of the said artificial magnets having a plurality of separate windings, one of the said windings being in series with the field of the said dynamo and the said variable resistance, whereby the incremental action of the field-current increases the said variable resistance, a second winding on the same artificial magnet connected in multiple to the working circuit of the said dynamo whereby the incremental action of the voltage of said working circuit assists the field-current to increase the said variable resistance, an opposing artificial magnet having a single winding connected in multiple with the middle cells of a storage battery charged by said dynamo, whereby the incremental action of the counter electromotive force of the storage battery automatically decreases the said variable resistance and thereby keeps the voltage of the said working circuit slightly in excess of the voltage of the said storage battery, a spring the force of which assists the opposing artificial magnet to decrease the said variable resistance, and a resistance connected as a shunt to the said variable resistance; substantially as described.

9. A voltage-regulator for a self-exciting dynamo comprising the combination with a variable resistance connected in series with the field of the dynamo, two opposing artificial magnets, each magnet having a plurality of separate windings, one of the windings on one of the said artificial magnets being connected in series with the shunt-field of the said dynamo and the said variable resistance whereby the incremental action of the field-current tends to increase said variable resistance, the second winding on the same artificial magnet being across the brushes of the said dynamo whereby the incremental action of the voltage of the dynamo assists the action of the field-current to increase the said variable resistance, one of the windings on the opposing artificial magnet being energized by a current proportional to the intensity of the electrical output of the said dynamo whereby the incremental action of the electrical output automatically decreases the said variable resistance and thereby causes the intensity of the shunt-field current to increase when the said electrical output is increased, the second winding of the opposing magnet being connected in multiple with the middle cells of a storage battery whereby the incremental action of the counter electromotive force of the batteries automatically and independently decreases the said variable resistance and thereby cause the dynamo to automatically keep its voltage slightly in excess of the counter electromotive force of the batteries, a spring the tension of which assists the action of the opposing artificial magnet, and a resistance whose temperature coefficient is negative connected as a shunt to the said variable resistance; substantially as described.

In testimony whereof I hereunto affix my signature, in the presence of two witnesses, this 27th day of September, 1905.

GEORGE S. NEELEY.

Witnesses:
 F. R. CORNWALL,
 GEORGE BAKEWELL.